(12) United States Patent
Sugino et al.

(10) Patent No.: US 6,961,178 B2
(45) Date of Patent: Nov. 1, 2005

(54) POLARIZING FILM, OPTICAL FILM AND LIQUID CRYSTAL DISPLAY USING POLARIZING FILM

(75) Inventors: Youichirou Sugino, Ibaraki (JP); Kazuki Tsuchimoto, Ibaraki (JP); Takashi Shouda, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 140 days.

(21) Appl. No.: 10/117,843

(22) Filed: Apr. 4, 2002

(65) Prior Publication Data

US 2003/0189754 A1 Oct. 9, 2003

(30) Foreign Application Priority Data

Apr. 6, 2002 (JP) ........................................ 2001-108409

(51) Int. Cl.[7] ............................ G02B 27/28; G02B 5/30
(52) U.S. Cl. ........................ 359/485; 359/500; 359/483
(58) Field of Search ........................ 359/483, 485, 359/492, 494, 500; 156/499, 213, 304.4, 99; 100/90, 211; 428/216; 264/1.34; 344/96

(56) References Cited

U.S. PATENT DOCUMENTS

| 2,237,567 | A | | 4/1941 | Land ............................ 359/491 |
|---|---|---|---|---|
| 3,051,054 | A | | 8/1962 | Crandon ....................... 359/491 |
| 3,208,902 | A | | 9/1965 | Arond et al. ................. 428/336 |
| 3,322,601 | A | * | 5/1967 | Wong et al. .................. 156/499 |
| 3,772,128 | A | | 11/1973 | Kahn et al. ................... 156/555 |
| 4,230,768 | A | | 10/1980 | Hamada et al. .............. 428/352 |
| 4,370,374 | A | * | 1/1983 | Raabe et al. ................. 428/216 |
| 4,387,133 | A | | 6/1983 | Ichikawa et al. ............. 428/215 |
| 5,880,800 | A | | 3/1999 | Mikura et al. ............... 349/122 |
| 6,301,045 | B1 | * | 10/2001 | Liu ............................ 359/484 |
| 6,760,156 | B2 | * | 7/2004 | Tsuchimoto et al. ......... 359/492 |
| 2005/0019505 | A1 | * | 1/2005 | Hamamoto et al. ......... 428/1.31 |

FOREIGN PATENT DOCUMENTS

| JP | 2-191902 | | 7/1990 |
|---|---|---|---|
| JP | 02241798 A | * | 9/1990 |
| JP | 5-107149 | | 4/1993 |
| JP | 6-51117 | | 2/1994 |
| JP | 2000-199819 | | 7/2000 |
| JP | 2002-303725 | | 10/2002 |
| JP | 2002-303727 | | 10/2002 |

OTHER PUBLICATIONS

Office Action dated Nov. 10, 2004 issued by Taiwan Patent Office.

* cited by examiner

*Primary Examiner*—Leonidas Boutsikaris
(74) *Attorney, Agent, or Firm*—Westerman, Hattori, Daniels & Adrian, LLP

(57) ABSTRACT

A polarizing film comprising a polarizer (A) and a protection film (B) prepared on at least one face of the polarizer (A), wherein the protection film (B) is adhered to the polarizer (A) without using adhesives, is induced problems by use of adhesives.

28 Claims, 1 Drawing Sheet

POLARIZING FILM, OPTICAL FILM AND LIQUID CRYSTAL DISPLAY USING POLARIZING FILM

BACKGROUND OF THE INVENTION

1. Field of the Invention

The present invention relates to a polarizing film. A polarizing film of the present invention independently or a laminating optical film may form a visual display, such as a liquid crystal display, an organic EL display, a PDP (plasma display panel) a liquid crystal display.

2. Description of the Prior Art

In a liquid crystal display, it is indispensable that polarizers should be arranged at both sides of a glass substrate that forms a top surface of a liquid crystal panel according to a picture formation method. Generally, polarizing film is used a polarizer, comprising a polyvinyl alcohol derived film, and dichroism substances, such as iodine, on which a protection film is adhered.

Conventionally, the above described polarizing film is manufactured by adhering a polarizer and a protection film by adhesives. Adhesives are compounds or composites that have combining components, and are used also as solution dissolved in water or organic solvents. Furthermore, they are hardened with heat, light irradiation or by a chemical reaction, etc. Such adhesives are poured in between these layers, immediately before the polarizer and the protection film are adhered, or they are beforehand applied to either of the polarizer or the protection film.

However, when adhesives are used, many processes are needed in manufacturing process and then a large amount of expense is required in production facilities in which an application process, a laminating process and a drying process of adhesives are required. Further a saponification processing, a corona treatment, a plasma treatment, a low-pressure UV processing or an undercoat processing etc. should be given to a protection film, in order to raise an adhesive property with a polarizer. Consequently, production cost of the polarizing film obtained also becomes expensive. Moreover,if the manufacturing process requires many steps, a factor of giving defects in each of the process will also be increased.

Moreover, as the above-mentioned adhesives, many water-soluble adhesives, such as polyvinyl alcohol aqueous solution, are used, and then a produced polarizing film does not have sufficient durability under a heated or humidified condition. Therefore, the portion of adhesives is easy to be influenced with moisture, and this is one of the causes of degradation of a polarizing film in early stage of use.

SUMMARY OF THE INVENTION

An object of the present invention is to provide a polarizing film in which problems induced by use of adhesives are solved. Furthermore, an object of the present invention is to provide an optical film in which the above described polarizing film is laminated and to provide a visual display.

As a result of repeated examinations carried out wholeheartedly by the present inventors to solve the above-mentioned problems, it was found out, as is shown below, that the above described object is attained using a polarizing film shown below and the present invention was completed.

Accordingly, the present invention relates to a polarizing film comprising a polarizer (A) and a protection film (B) prepared on at least one face of the polarizer (A), wherein the protection film (B) is adhered to the polarizer (A) without using adhesives.

In a polarizing film of the present invention, since a polarizer (A) and a protection film (B) are adhered together without using adhesives, neither a problem on manufacturing process induced by using adhesives nor a problem in durability of a polarizing film concerning adhesives is given.

In the above described polarizing film, adhesive strength between a polarizer (A) and a protection film (B) is preferably not less than 10N/25 mm. A film having an adhesive strength mentioned above has a good adhesive property, and also has preferable durability. Furthermore, an adhesive strength is preferably not less than 12N/25 mm.

In above described polarizing film, it is preferable that a retardation within a plane of a protection film (B) is not more than 10 nm. As for the retardation within a plane of a protection film (B) used for a polarizing film, it is more preferable to be not more than 7 nm.

In the above described polarizing film, it is preferable that the thickness of a protection film (B) is not more than 50 micrometers. Although a thickness of a protection film (B) is not especially limited, it is more preferable to be not more than 40 micrometers with a tendency for a thinner polarizing film to be obtained.

In the above described polarizing film, it is preferable that a moisture permeability of a protection film (B) is not more than 60 $g/m^2$-24 hours-atm. A protection film (B) that has the above described moisture permeability gives a good moisture-proof property under humidified condition to a polarizing film, and degradation of the polarizing film with an influence of moisture is prevented well. The above-mentioned moisture permeability is more preferably not more than 40 $g/m^2$-24 hours-atm.

In the above described polarizing film, it is preferable that an elastic modulus of a protection film (B) is not less than 2000 $N/mm^2$. A protection film (B) that has the above described mechanical strength of an elastic modulus demonstrates a good handling property in manufacturing process of a polarizing film. The above described elastic modulus is more preferably 2500 $N/mm^2$.

In the above described polarizing film, it is preferable that a surface free energy on a side of the protection film (B) to which the polarizer (A) is not adhered is not less than 40 mN/m. An adhesive is applied onto a polarizing film to form an adhesion layer in order that a polarizing film is adhered on glass cells of a liquid crystal display. When a protection film (B) having the above described surface free energy is used to a face that forms the adhesion layer, good adhesion with an adhesive will be obtained. The above described surface free energy is more preferably is not less than 50 mN/m.

In the above described polarizing film, it is preferable that a light transmittance of a protection film (B) is not less than 86%. A protection film (B) with the above described light transmittance has a high transparency as an optical property. The above described light transmittance is more preferably is not less than 88%.

Moreover, preferably a polarizing film has not less than 42% of light transmittance, and not less than 95% of polarization degree. A polarizing film with the above described light transmittance and polarization degree has an optical property fully satisfying panel characteristics of a liquid crystal display. More preferably a light transmittance of a polarizing film is not less than 42.5%, and a polarization degree not less than 98%.

Moreover, the present invention relates to an optical film, wherein at least one sheet of the above described polarizing film is laminated, and to a visual display, wherein the above described polarizing film or the above described optical film is used.

DESCRIPTION OF THE PREFERRED EMBODIMENT

Figure 1:
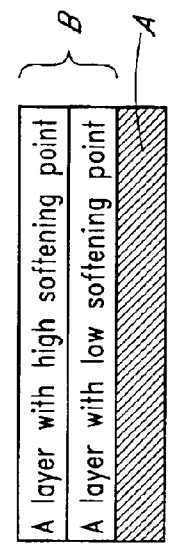
FIG. 1 shows a polarizing film of the present invention.
Figure 1:
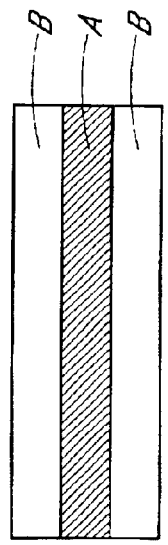

In a polarizing film of the present invention, as is shown in FIG. 1, a protection film (B) is directly prepared on at least one face of a polarizer (A). In FIG. 1, the protection films (B) are prepared on both sides of a polarizer (A). The protection film (B) may be prepared only on one side of a polarizer (A).

A polarizer(A) is not limited especially but various kinds of polarizer may be used. As a polarizer (A), for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the protective film (B) prepared in one side or both sides of the above-mentioned polarizer (A), with outstanding transparency, mechanical strength, heat stability, moisture cover property, isotropy, etc. may be preferable. As materials of the above-mentioned protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers,such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned.

Figure 2:
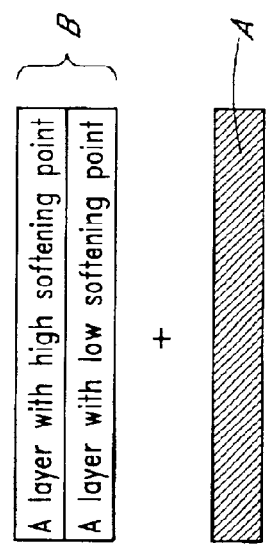
FIG. 2 is a conceptual figure where thermocompression bonding a protection film and a polarizer.

In order to adhering protection film (B) to a polarizer (A) without using adhesives, a film formed two or more layers having each different softening point, which is suitably selected from the above described material, is used as the protection film (B). As shown in FIG. 2, a film layer in a side of layer with a lower softening point of a protection film (B) is laminating onto at least one face of a polarizer (A), and thermocompression bonding. A protection film (B) and a polarizer (A) may be adhered without using adhesives. In FIG. 2, a protection film (B) is prepared only in one side of a polarizer (A).

Although the each material that forms above described two or more layer s film may be of the same material and may be of materials of different kinds, it is preferable to be of the same material. However, a thermoplastic resin melted by thermocompression bonding is used as a resin that forms the layer with a lower softening point in a side adhered to a polarizer (A). A softening point of the resin that forms the layer with a lower softening point in a side adhered to a polarizer (A) is preferably not less than 80 degrees C. and more preferably not less than 90 more degrees C. A difference of the softening points between the resins that form two or more film layers is preferably not less than 5 degrees C. and more preferably not less than 10 degrees C. In addition, a softening point is a value measured by Vicat softening-temperature examination method of JIS K7206.

Generally, a thickness of a protection film (B) is not more than 500 micrometers, preferably 1 to 300 micrometers, and more preferably 5 to 200 micrometers. Especially as mentioned above a thickness of a protection film (B) is preferably not more than 50 micrometers. In addition, when the protection films (B) having two or more layers are used, the layer with a lower softening point on a side to which a polarizer (A) is adhered has suitably a thickness of about 1 to 100 micrometers.

In the above described protection film (B), a hard coating layer, reflective prevention processing, and processing aiming at sticking prevention, diffusion, or anti glare function may be provided to the face that is not adhered to a polarizer (A). In addition, the above described reflection prevention layer, sticking prevention layer, diffusion layer, anti glare layer, etc. may be prepared to the protection film (B) itself, and moreover these layers may also be prepared separately as an independent optical layer of a protection film (B).

A polarizing film of the present invention is manufactured in a way that, for example, the lower softening point layer of the above described protection film (B) that has two or more layers is laminating on at least one face of the above described polarizer (A), and thermocompression bonding at a temperature at which a higher softening point layer is not melted but a lower softening point layer is melted, that is, at a temperature in a range between the softening points of each resin forming the two or more layers.

A method of thermocompression bonding a polarizer (A) and a protection film (B) is not especially limited, and a method may be adopted in which heating treatment is performed simultaneously or sequentially with pressurization. As heating methods, for example, non-contact heating methods using IR heater, heated air, high frequency, ultrasonic wave, etc., and contact heating methods by heat conduction using hot plate or hot roll etc. may be mentioned. As pressurization method, a pressurizing method by pinch roll etc. may be mentioned. Pressurization may also be performed in a vacuum. When pressurizing is given simultaneously with heating treatment, a method may be adopted in which films are passed between heated pinch rolls and pressurized with heating. After thermocompression bonding, the films are cooled, and therefore a melted film layer (a lower softening point layer) of a protection film (B) is hardened to give an adhesion between the polarizer (A) and the protection film (B).

The polarizing film of the present invention may be used in practical use as an optical film laminated with other optical layers. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing films are; a reflection type polarizing film or a transflective type polarizing film in which a reflective plate or a transflective reflective plate is further laminated onto a polarizing film of the present invention; an elliptically polarizing film or a circular polarizing film in which a retardation plate is further laminated onto the polarizing film; a wide viewing angle polarizing film in which a viewing angle compensation film is further laminated onto the polarizing film; or a polarizing film in which a brightness enhancement film is further laminated onto the polarizing film.

A reflective layer is prepared on a polarizing film to give a reflection type polarizing film, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing film may be formed using suitable methods, such as a method in which a reflective layer of metal etc. is, if required, attached to one side of a polarizing film through a transparent protective layer etc.

As an example of a reflection type polarizing film, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing film, a reflection plate may also be used as a reflective sheet constituted by preparing a reflective layer on the suitable film for the transparent film. In addition, since a reflective layer is usually made of metal, it is desirable that the reflective side is covered with a protective film or a polarizing film etc. when used, from a viewpoint of preventing deterioration in reflectance by oxidation, of maintaining an initial reflectance for a long period of time and of avoiding preparation of a protective layer separately etc.

In addition, a transflective type polarizing film may be obtained by preparing the above-mentioned reflective layer as a transflective type reflective layer, such as a half-mirror etc. that reflects and transmits light. A transflective type polarizing film is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing film. That is, the transflective type polarizing film is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing film may be used as elliptically polarizing film or circularly polarizing film on which the retardation plate is laminated. A description of the above-mentioned elliptically polarizing film or circularly polarizing film will be made in the following paragraph. These polarizing films change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light in to circularly polarized light, what is called a quarter wavelength plate (also called λ/4 plate) is used. Usually, half-wavelength plate (also called λ/2 plate) is used, when changing the polarization direction of linearly polarized light.

Elliptically polarizing film is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing film in which three-dimensional refractive index is controlled may also preferably compensate (prevent) coloring produced when a screen of a liquid crystal display is viewed from an oblique direction. Circularly polarizing film is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and maybe a retardation plate in which two or more sorts of retardation plates is laminated so that optical properties, such as retardation, may be controlled.

The above-mentioned elliptically polarizing film and an above-mentioned reflected type elliptically polarizing film are laminated plate combining suitably a polarizing film or a reflection type polarizing film with a retardation plate. This type of elliptically polarizing film etc. may be manufactured by combining a polarizing film (reflected type) and a retardation plate, and by laminating them one by one separately in the manufacture process of a liquid crystal display. On the other hand, the polarizing film in which lamination was beforehand carried out and was obtained as an optical film, such as an elliptically polarizing film, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing film with which a polarizing film and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing film, which is obtained by laminating a brightness enhancement film to a polarizing film, thus does not transmit light without the predetermined polarization state and reflects it, while obtaining transmitted light with the predetermined polarization state by accepting a light from light sources, such as a backlight. This polarizing film makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing film simultaneously supplies polarized light that is difficult to be absorbed in a polarizer, and increases the quantity of the light usable for a liquid crystal picture display etc., and as a result luminosity maybe improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing film as it is, the absorption loss by the polarizing film is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing film and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing film may consist of multi-layered film of laminated layers of a polarizing film and two of more of optical layers as the above-mentioned separated type polarizing film. Therefore, a polarizing film may be a reflection type elliptically polarizing film or a semi-transmission type elliptically polarizing film, etc. in which the above-mentioned reflection type polarizing film or a transflective type polarizing film is combined with above described retardation plate respectively.

Although an optical film with the above described optical layer laminated to the polarizing film may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing film and other optical films, the optical axis may be set as a suitable configuration angle according to the target retardation characteristics etc.

In the polarizing film mentioned above and the optical film in which at least one layer of the polarizing film is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives maybe preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethylacetate or a mixed solvent of these two solvents is prepared. A method in which this solution is directly applied on a polarizing film top or a optical film top using suitable developing methods, such as flow method and coating method, or a method in which an adhesive layer is once formed on a separator, as mentioned above, and is then transferred on a polarizing film or an optical film may be mentioned.

An adhesive layer may also be prepared on one side or both sides of a polarizing film or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing film or an optical film. Thickness of an adhesive layer may be suitably determined depending on a purpose of usage or adhesive strength, etc., and generally is 1 to 500 $\mu$m, preferably 5 to 200 $\mu$m, and more preferably 10 to 100 $\mu$m.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing film, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, $\pi$ type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one Layer or two or more layers.

Subsequently, organic electro luminescence equipment (organic EL display) will be explained. Generally, inorganic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing film, while preparing the polarizing film on the surface side of the transparent electrode.

Since the retardation plate and the polarizing film have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing film and the retardation plate is adjusted to π/4, the mirror surface of the metal electrode may be completely covered.

This means that only linearly polarized light component of the external light that enters as incident light into this organic EL display is transmitted with the work of polarizing film. This linearly polarized light generally gives an elliptically polarized light by the retardation plate, and especially the retardation plate is a quarter wavelength plate, and moreover when the angle between the two polarization directions of the polarizing film and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing film, it cannot be transmitted through the polarizing film. As the result, mirror surface of the metal electrode may be completely covered.

EXAMPLE

Examples showing constitution and effects of the present invention will be concretely described hereinafter. Measured value is obtained by the following methods.
(Adhesive Strength)
A polarizing film was pulled using a tensile testing machine at a peeling angle of 90 degrees, and a peeling speed of 300 mm/minute, and tensile strength (N/25 mm) was measured.
(Retardation Within a Plane)
Measurement was performed with an automatic birefringence measuring equipment manufactured by Oji Scientific Instruments KOBRA21ADH.
(Moisture Permeability)
Measurement was performed according to the moisture-permeability examination (cup method) of JIS Z0208. A weight (g) of water vapor that passes a sample having 0.1 mm in thickness and area of 1 m$^2$ in 24 hours under a condition of 90% of relative humidity difference.
(Elastic Modulus)
An elastic modulus (N/mm$^2$) was measured according to the tensile testing examining method of JIS K7127.
(Surface Free Energy)
Measurement was performed by contact-angle measurement method using the extended Forks' expression (water, methylene iodide, and alpha-bromonaphthalene were used as medium).
(Light Transmittance)
A transmittance of one sheet of a polarizing film or a protection film was measured using the spectrophotometer (made Murakami Color Research Laboratory, CMS-500). In addition, the transmittance of a polarizing film or a protection film is Y value in which visibility compensation was twice carried out by the visual field (luminous source C) of JIS Z8701.
(Polarization Degree)
A transmittance ($H_0$) when two sheets of the same polarizing films were piled up so that polarization axis may be parallel, and a transmittance ($H_{90}$) when two sheets of the same polarizing films were piled up so that polarization axis may be orthogonal were measured using the above described spectrophotometer to obtain a polarization degree from the following formula.

$$\text{Polarization-degree (\%)} = \sqrt{\{(H_0 - H_{90})/(H_0 + H_{90})\}} \times 100$$

In addition, the transmittance ($H_0$) in the case of being parallel and the transmittance in the case of being orthogonal ($H_{90}$) are Y values in which visibility compensation was twice carried out by the visual field (luminous source C).

Example 1

(Polarizer)

After a polyvinyl alcohol film with a degree of polymerization 2400 and a thickness of 80 micrometers was swelled in warm water at 30 degree C., it was dyed while being stretched in 3 times in an iodine/potassium iodide aqueous solution at 30 degree C. Then, after being stretched in 40 to 60-degree C. warm water, the film was stretched again while being cross-linked in boric acid aqueous solution. In this case stretching was carried out so that a total stretching ratio might be 6 times. Finally, adjustment of a hue was performed in 30 to 40-degree C. potassium iodide aqueous solution, and a polarizing film was dried so that a moisture regain might be 5 to 12% of range was obtained.

(Protection Film)

A protection film (total thickness of 40 micrometers) of two-layered structure comprising a polyethylene-terephthalate film (32 micrometers) with a softening point of 130 degrees C., and a polyethylene-terephthalate film (8 micrometers) with a softening point of 145 degrees C. was used.

A retardation within a plane of a protection film was 3.0 nm.
A moisture permeability was 29.8 g/m$^2$-24 hours-atm.
An elastic modulus was 4218.3 N/mm$^2$.
Surface free energy of the side not adhered to a polarizer was 56 mN/m.
Light transmittance was 92.4%.

(Preparation of a Polarizing Film)

The film faces in a side with a low softening point of the above described protection films were laminated to both sides of a polarizer and then the combined film was thermocompression bonded at 135 degrees C., using a roll laminator to obtain polarizing film. In the obtained polarizing film, adhesion between the polarizer and the protection film was obtained well, and an appearance was also satisfactory. An adhesive strength of the polarizer and the protection film in the polarizing film was 14N/25 mm. Transmittance was 43.6% and polarization degree was 99.9%.

What is claimed is:

1. A polarizing film comprising a polarizer (A) and a protection film (B) prepared on at least one face of the polarizer (A), wherein the protection film (B) is adhered to the polarizer (A) without using adhesives, wherein the protection film (B) is formed by at least two layers of the same materials but having different softening points, the layer having the lower softening point being located on a side of the protection film (B) facing the polarizer (A), and wherein the polarizer (A) is a dyed and stretched hydrophilic polymer film.

2. The polarizing film according to claim 1, wherein an adhesive strength between the polarizer (A) and the protection film (B) is not less than 10N/25 mm.

3. The polarizing film according to claim 1, wherein a retardation within a plane of the protection film (B) is not more than 10 nm.

4. The polarizing film according to claim 1, wherein a thickness of the protection film (B) is not more than 50 micrometers.

5. The polarizing film according to claim 1, wherein a moisture permeability of the protection film (B) is not more than 60 g/m$^2$-24 hours-atm.

6. The polarizing film according to claim 1, wherein an elastic modulus of the protection film (B) is not less than 2000 N/mm$^2$.

7. The polarizing film according to claim 1, wherein a surface free energy on a side of the protection film (B) to which the polarizer (A) is not adhered is not less than 40 mN/m.

8. The polarizing film according to claim 1, wherein a light transmittance of a protection film (B) is not less than 86%.

9. The polarizing film according to claim 1, wherein light transmittance is not less than 42%, and polarization degree is not less than 95%.

10. An optical film, wherein at least one sheet of the polarizing film according to claim 1 is laminated.

11. A visual display comprising the polarizing film according to claim 1.

12. The polarizing film according to claim 6, wherein the elastic modulus of the protection film (B) is not less than 2500 N/mm$^2$.

13. The polarizing film according to claim 2, wherein the adhesive strength between the polarizer (A) and the protection film (B) is not less than 12N/25 mm.

14. The polarizing film according to claim 2, wherein the adhesive strength between the polarizer (A) and the protection film (B) is not less than 14N/25 mm.

15. The polarizing film according to claim 7, wherein the surface free energy on a side of the protection film (B) to which the polarizer (A) is not adhered is not less than 50 mN/m.

16. The polarizing film according to claim 7, wherein the surface free energy on a side of the protection film (B) to which the polarizer (A) is not adhered is not less than 56 mN/m.

17. The polarizing film according to claim 8, wherein a light transmittance of a protection film (B) is not less than 88%.

18. The polarizing film according to claim 8, wherein a light transmittance of a protection film (B) is not less than 92.4%.

19. The polarizing film according to claim 9, wherein the light transmittance is not less than 42.5%, and the polarization degree is not less than 98%.

20. The polarizing film according to claim 9, wherein the light transmittance is not less than 43.6%, and the polarization degree is not less than 99.9%.

21. The polarizing film according to claim 1, wherein a difference between the softening points is not less than 5° C.

22. The polarizing film according to claim 21, wherein a difference between the softening points is not less than 10° C.

23. The polarizing film according to claim 1, wherein the layer with a lower softening point on a side to which a polarizer (A) is adhered has a thickness of about 1 to about 100 micrometers.

24. The polarizing film according to any one of claims 1 and 2, wherein the protection film (B) has a thickness of not more than 500 micrometers.

25. The polarizing film according to any one of claims 1 and 2, wherein the protection film (B) has a thickness of 1 to 300 micrometers.

26. The polarizing film according to any one of claims 1 and 2, wherein the protection film (B) has a thickness of 5 to 200 micrometers.

27. The polarizing film according to any one of claims 1 and 2, wherein the protection film (B) has a thickness of from 1 to 300 micrometers.

28. The polarizing film according to any one of claims 1 and 2, wherein the protection film (B) has a thickness of from 5 to 200 micrometers.

* * * * *